United States Patent
Dörr et al.

[11] Patent Number: 5,379,872
[45] Date of Patent: Jan. 10, 1995

[54] LOCKING ARRANGEMENT FOR A SELECTOR LEVER OF AN AUTOMATIC MOTOR VEHICLE TRANSMISSION

[75] Inventors: Konrad Dörr, Heilbronn; Albrecht Reustle, Walheim; Alfred Jozefiak, Kieselbronn, all of Germany

[73] Assignee: Dr. Ing. h.c.F. Porsche AG, Germany

[21] Appl. No.: 100,209

[22] Filed: Aug. 2, 1993

Related U.S. Application Data

[63] Continuation of Ser. No. 901,595, Jun. 19, 1992, abandoned.

[30] Foreign Application Priority Data

Jun. 20, 1991 [DE] Germany .............................. 4120379

[51] Int. Cl.⁶ .............................................. B60K 41/26
[52] U.S. Cl. ..................................... 192/4 A; 74/475; 74/527
[58] Field of Search ............... 192/4 A; 74/475, 477, 74/483 R, 527, 529; 180/271; 70/245, 247, 248, 254

[56] References Cited

U.S. PATENT DOCUMENTS

| | | | |
|---|---|---|---|
| 4,126,055 | 11/1978 | Forsyth | 74/476 |
| 4,473,141 | 9/1984 | Mochida | 192/4 A X |
| 4,572,340 | 2/1986 | Pierce | 192/4 A X |
| 4,926,688 | 5/1990 | Murasaki | 74/527 |
| 4,934,496 | 6/1990 | Barske et al. | 192/4 A |
| 5,018,610 | 5/1991 | Rolinski et al. | 192/4 A |
| 5,025,901 | 6/1991 | Kito et al. | 192/4 A |
| 5,133,222 | 7/1992 | Hansson | 74/477 |

FOREIGN PATENT DOCUMENTS

| | | | |
|---|---|---|---|
| 0347150 | 12/1989 | European Pat. Off. | |
| 3419168 | 11/1985 | Germany . | |
| 3911570 | 6/1990 | Germany . | |
| 1-4545 | 1/1989 | Japan | 192/4 A |
| 1-22630 | 1/1989 | Japan | 74/475 |
| 1-22631 | 1/1989 | Japan | 192/4 A |
| 2-136329 | 5/1990 | Japan | 74/477 |
| 2-199358 | 8/1990 | Japan | 192/4 A |

*Primary Examiner*—Richard M. Lorence
*Attorney, Agent, or Firm*—Evenson, McKeown, Edwards & Lenahan

[57] ABSTRACT

A locking arrangement for the selector lever 1 of an automatic transmission locks the selector lever in the neutral positions P and N by the form-locking engagement of a selector-lever-fixed locking member in indentations of a rotatable pawl. An actuating force, which is applied to the selector lever in the locked condition, by way of curved contact surfaces of the locking member, at a contact point, is introduced into steep flanks bounding the indentations. A resulting low supporting force exercises so little stress on two rollers supporting the pawl that, by means of a lifting magnet, one roller, despite the acting actuating force, can easily be displaced in a position which releases the pawl and unlocks the selector lever.

15 Claims, 4 Drawing Sheets

LOCKING ARRANGEMENT FOR A SELECTOR LEVER OF AN AUTOMATIC MOTOR VEHICLE TRANSMISSION

This is a continuation of application Ser. No. 07/901,595, filed Jun. 19, 1992, now abandoned.

BACKGROUND AND SUMMARY OF THE INVENTION

This application is related to application Ser. No. 07/901,036, filed on even date, and based on German Patent Application P No. 41 20 382.8; and application Ser. No. 07/901,225 filed on even date, and based on German Patent Application P No. 41 20 380.1.

The present invention relates to a locking arrangement for a selector lever of an automatic motor vehicle transmission. A locking member arranged on the selector lever form-lockingly engages in corresponding indentations of an adjustable pawl when the brake is not operated so that the selector lever is locked in the neutral positions (P and N).

In vehicles having the above-described arrangement, after the engine is started, the selector lever must be moved out of a neutral position {P (Parking) or N} into a driving position in order to be able to drive the vehicle. The vehicle may start to drive, although this is not intended, when, while the engine is running, the selector lever is inadvertently moved from the neutral position into a driving position. An unintended abrupt acceleration may also occur during the warmup phase of the engine, when the idling speed is increased, when the selector lever is brought into a driving position.

In order to avoid such disadvantages, it is known from German Patent Document DE 39 11 570 C1 to provide a locking arrangement for the selector lever of an automatic motor vehicle transmission in which a locking member arranged on the selector lever, in a form-locking manner, when the brake is not operated, engages in corresponding indentations of an adjustable pawl so that the selector lever is locked in the neutral positions {P (Parking) or N}. The adjusting of the pawl takes place by means of an actuating element which, in one embodiment, as a lifting magnet, is connected to an electric circuit controlled by a logic circuit. By means of several sensors and switches, the circuit processes information concerning, for example, driving speed, ignition key position and brake pedal operation.

It is an object of the invention to provide a locking arrangement of the above-mentioned type which permits a secure unlocking even when there are inappropriately high operating forces on the locked selector lever.

This and other objects are achieved by the present invention which provides a locking arrangement for a selector lever of an automatic motor vehicle transmission comprising a locking member arranged on the selector lever, and an adjustable pawl. The adjustable pawl has indentations into which the locking member form-lockingly engages when the brake is not operated so that the selector lever is locked in neutral positions. The pawl has steeply extending flanks which bound the indentations in which the locking member rests when the selector lever is locked and an actuating force is applied to the selector lever. The actuating force is introduced into the flanks of the pawl via contact surfaces of the selector lever at a contact point of the flanks. The flanks determine a substantially horizontal force component and a substantially vertical force component of the actuating force.

The locking arrangement according to the invention permits a secure unlocking when there are high operating forces on the locked selector lever since the locking member is arranged on the selector lever and is provided with contact surfaces and comes to rest in a contact point against steeply extending flanks which bound indentations in the pawl. By way of this contact point, the actuating force applied to the selector lever is introduced into the pawl. On the steep flanks, the introduced force disintegrates into an almost horizontal component pointing in the direction of the pivot of the pawl and into a downward-directed component which acts as an almost vertical supporting force. In this case, the steep flanks have the effect that this supporting force has a low range which is clearly exceeded by the horizontal component. As a result, the supporting force can act upon the components holding the pawl in the locked position only with a low power. As a result, the components can be removed from the pawl by low forces, whereby the pawl, while unlocking the selector lever, disengages from the locking member.

In an advantageous development, convexly curved contact surfaces, together with linearly extending flanks, ensure a single contact point which can be determined precisely with respect to its position. The steep-flanked design has the effect that the horizontal component is relatively large and points past the pivot of the pawl at a narrow distance. The extent of the supporting force is therefore small.

The components which hold the pawl in the locking position are constructed as rollers, one roller acting as a supporting member, which is stationarily arranged in the housing, and a second roller acting as a blocking member, by means of an actuating element being moved from a first position into a second position. In the second position, the respective indentation of the pawl is brought, by means of the actuating element, which may, for example, be a lifting magnet, into an engagement by way of the blocking member with the locking member which locks the selector lever. In this position, the supporting force is supported on the supporting member by means of the blocking member. Because of the small amount of this supporting force, the blocking member can be displaced into the second position by low forces. This is promoted by the development of the locking and the supporting member as low-friction rollers.

Other objects, advantages and novel features of the present invention will become apparent from the following detailed description of the invention when considered in conjunction with the accompanying drawings.

DETAILED DESCRIPTION OF THE DRAWINGS

Figure 1:
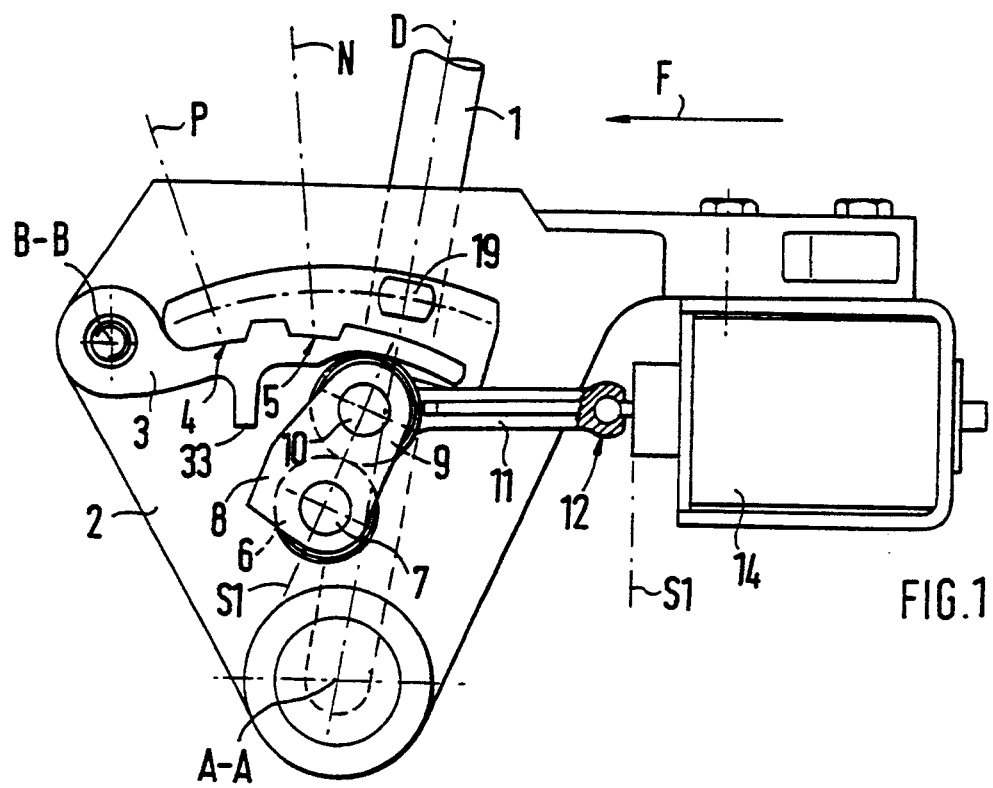
FIG. 1 is a schematic representation of a locking arrangement with a selector lever in a driving position constructed in accordance with a first embodiment of the present invention.

A selector lever 1 for an automatic transmission is held pivotally about an axis A—A in a housing 2. The selector lever 1 can be swivelled in neutral positions P and N as well as in at least one driving position D. The driving position is represented by an arrow F. On the housing 2, a pawl 3 is arranged, which can be rotated about a pivot B—B. The pawl 3 has an essentially arched shape and, on its top side, has indentations 4 and 5 which are assigned to the neutral positions P and N. A supporting member, which is constructed as a roller 6 in the embodiment of FIG. 1, is arranged on the housing 2 and is disposed on a shaft 7 in a low-friction manner. By means of a lever 8 disposed on the shaft 7, a blocking member constructed as a roller 9 is held in constant contact with the roller 6.

In the first embodiment of FIG. 1, a connecting rod 11 is also rotatably disposed on a shaft 10 bearing the roller 9. On the end side, this connecting rod 11 is connected with a plunger 13 of an actuating element which is a lifting magnet 14 and is held on the housing 2.

Figure 5:
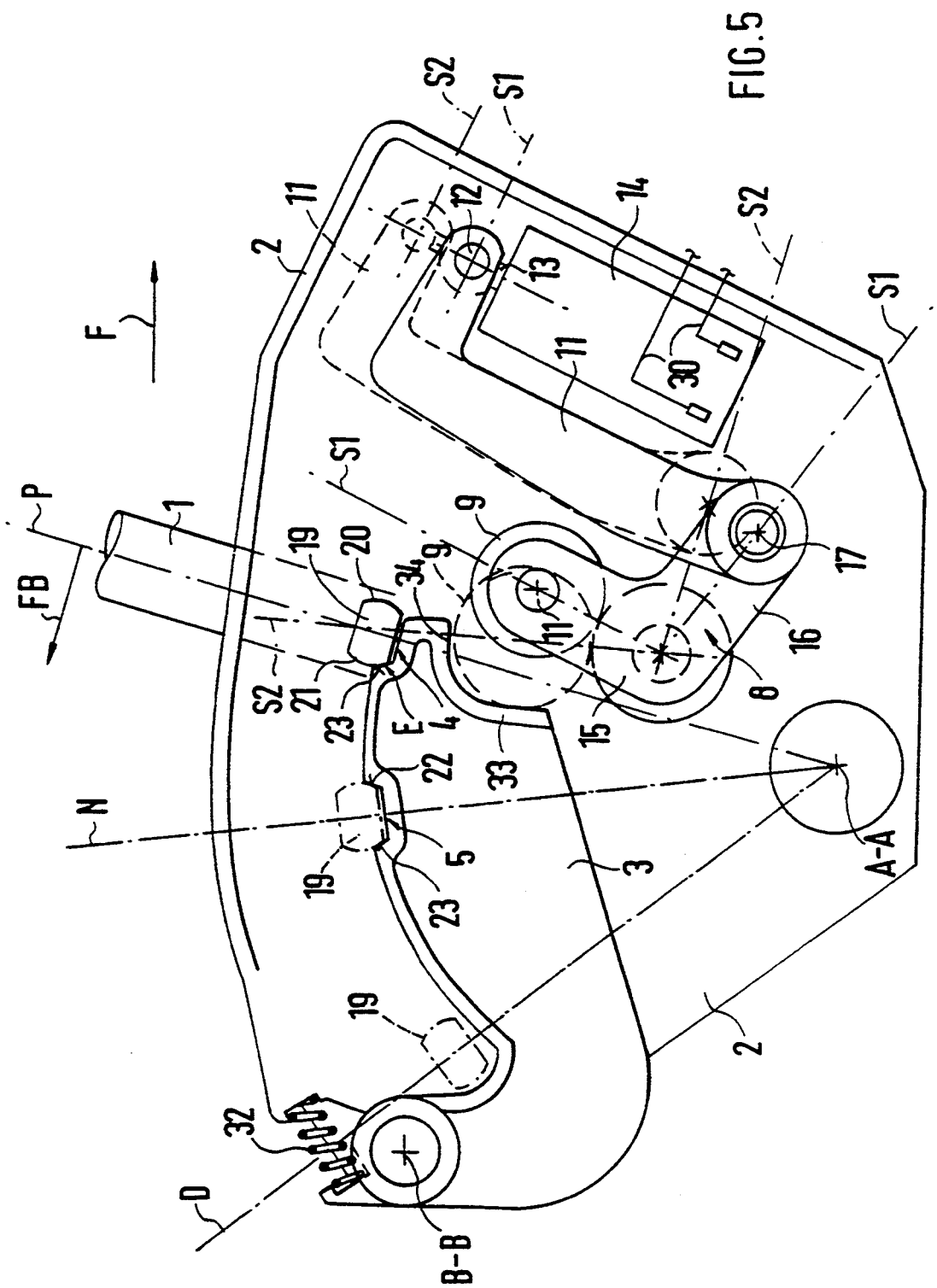
FIG. 5 is a schematic representation of a view in the direction of the arrow X according to FIG. 4.
Figure 4:
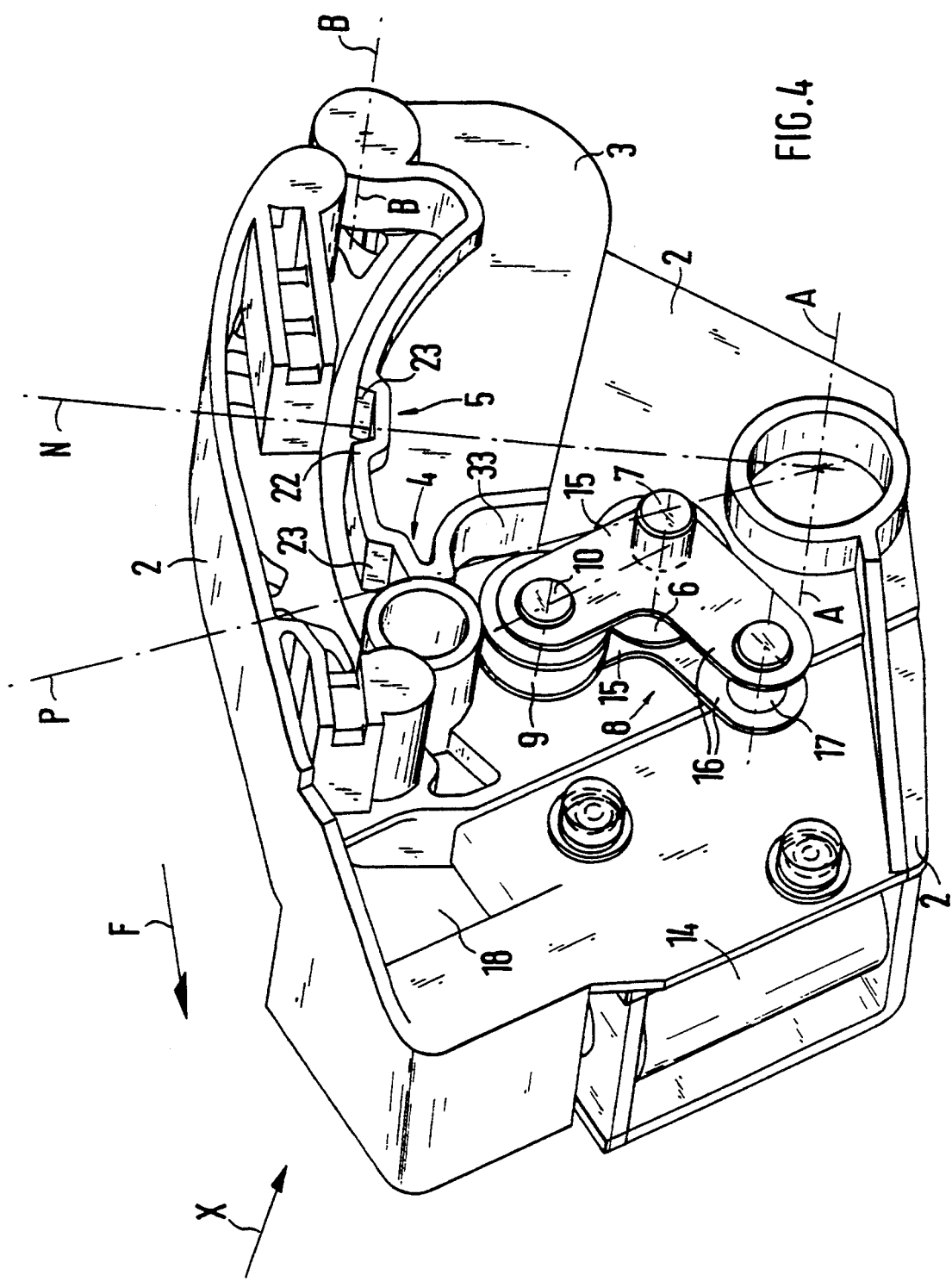
FIG. 4 is a schematic and perspective representation of a second embodiment of the invention.

According to the second embodiment of FIGS. 4 and 5, the lever 8 comprises two angle levers 15, which each have an almost right angle and between which the rollers 6 and 9 are arranged. Between the bent arms 16, a rigid shaft 17 is arranged on which the connecting rod 11 is rotatably disposed which, for this embodiment, is illustrated only in FIG. 5. In this embodiment, the connecting rod 11 is twice bent at a right angle and penetrates an opening 18 of the housing 2 in order to connect the ball joint 12 with the shaft 17. For the purpose of clarification, FIG. 4 does not show the connecting rod 11 and the selector lever 1.

In both embodiments, a locking member 19 is fastened to the selector lever 1 and is assigned to the indentations 4, 5 and has contact surfaces 20, 21 which extend in a convexly curved manner. As boundaries, the indentations 4 and 5 have steeply extending linear flanks 22, 23.

The lifting magnet 14 is controlled by a logic circuit 24 which utilizes information from a sensor 25 emitting a rotational-speed-dependent and driving-speed-dependent signal, from a sensor 26 detecting the position of the ignition key, from a switch 27 detecting the brake pedal operation, from a sensor 28 detecting the gear engaged in the transmission of the motor vehicle, and from a sensor 29 recognizing the position of the selector lever 1. The logic circuit 24 is connected with the lifting magnet 14 by means of electrical lines 30.

In the driving operation of the motor vehicle, the selector lever 1 is unlocked in the driving position D, and the roller 9 is held in a first position S1 by the lifting magnet 14 which does not receive current from the logic circuit 24. In a lowered position, the pawl 3 rests on the roller 9 by means of a ramp 31 but may also, as shown only in the second embodiment, be held to rest against the locking member 19, while avoiding rattling noises, by means of a pressure spring 32 supported on the housing 2.

Figure 2:
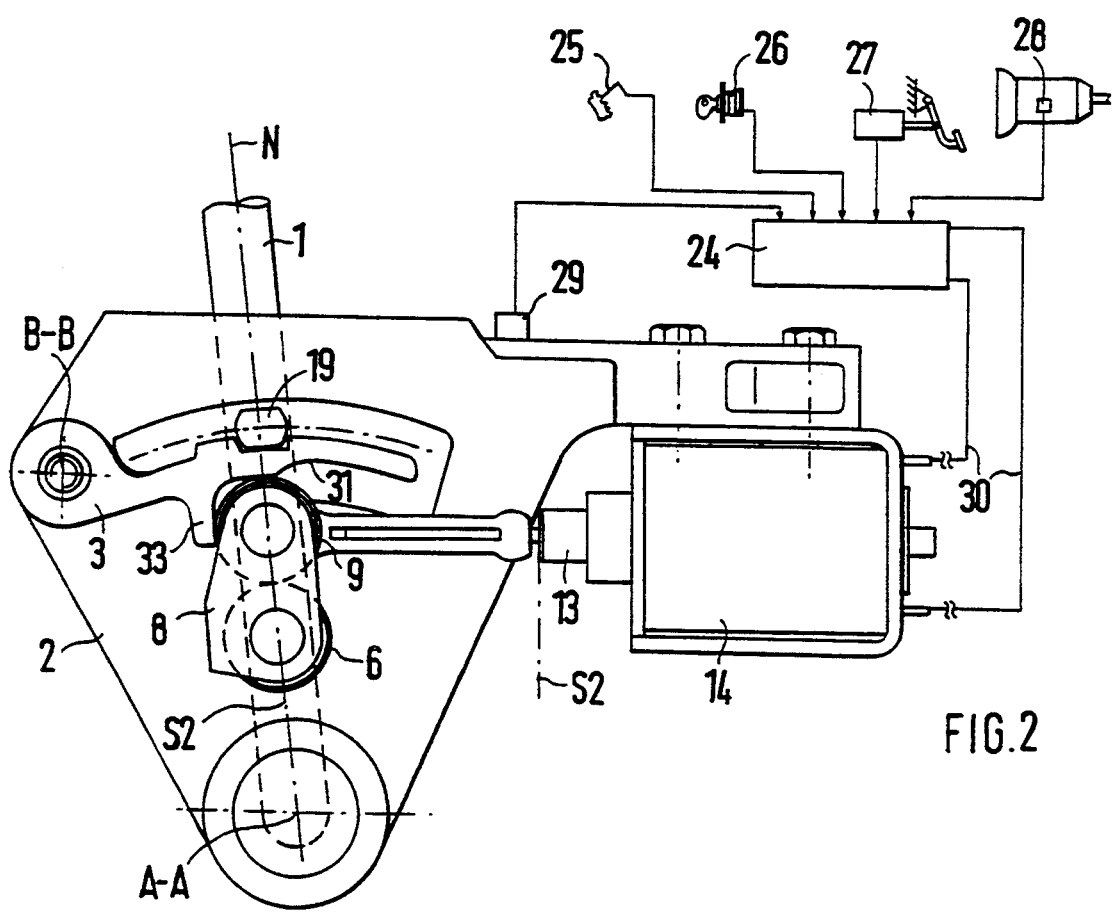
FIG. 2 is a schematic representation of a locking arrangement according to the first embodiment with a locked selector lever in a neutral position.

FIG. 2 illustrates the arrangement when the vehicle is stopped and the selector lever 1 is swivelled into a neutral position and the brake pedal is not operated. The lifting magnet 14, which is now supplied with current, moves the roller 9 by means of the plunger 13 and the connecting rod 11, into a second position S2 which locks the selector lever 1. When this happens, in the first embodiment, the roller 9, by way of the ramp 31, presses the pawl 3 into a lifted position in which the locking member 19 engages in the indentation 5. Here, position S2 is defined by a stop 33 molded onto the pawl 3. In the second embodiment, the pawl 3, as described above, remains in the lifted position.

When there is a subsequent attempt to engage a driving position, a high actuating force FB may act upon the selector lever 1 because of an improper handling of the selector lever 1. This may occur, for example, when a person operating the vehicle, while being unfamiliar with the locking arrangement, tries to leave a neutral position without actuating the brake pedal beforehand, as known from the German Patent Document DE 39 11 570 C1 which is used as a basis of this type of an arrangement.

Figure 3:
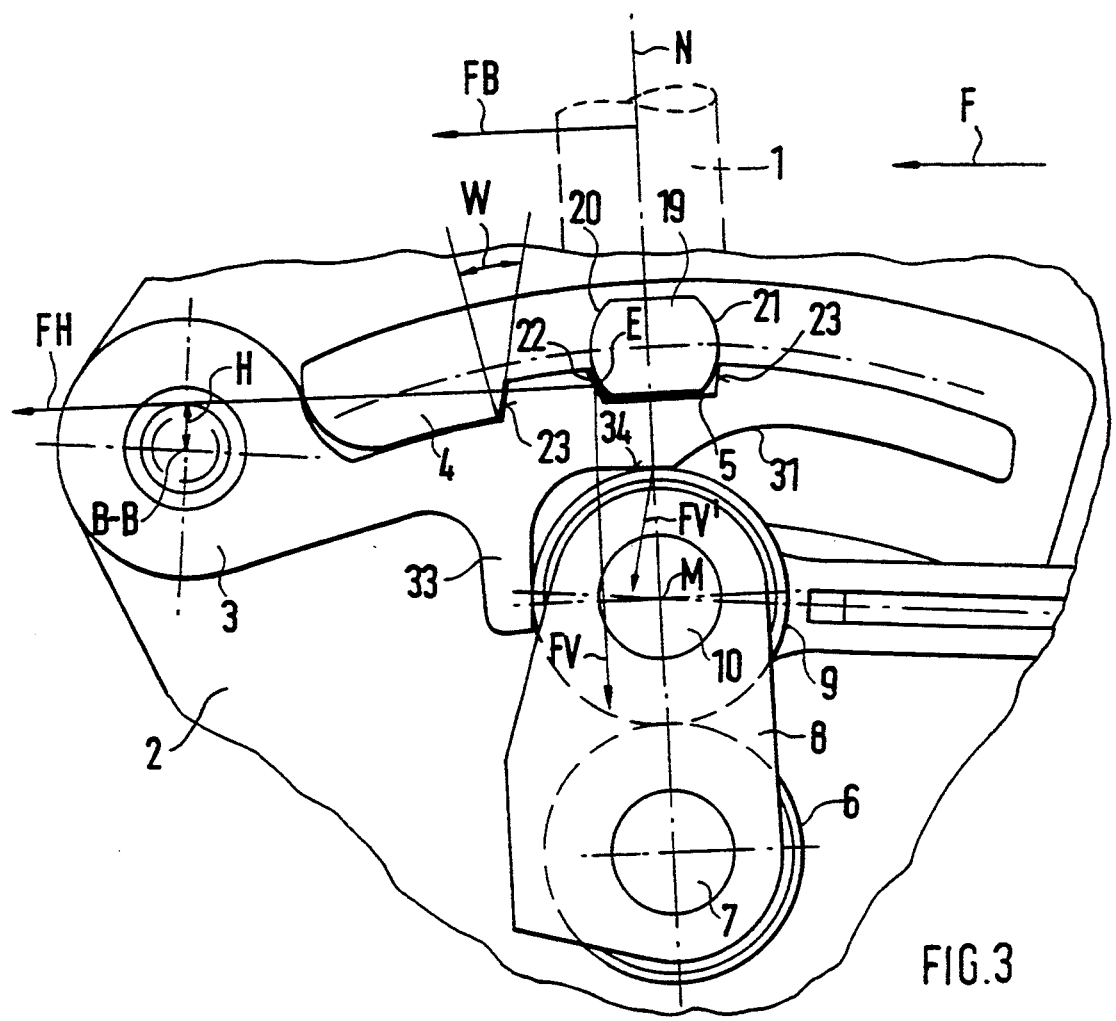
FIG. 3 is an enlarged portion of FIG. 2.

According to FIG. 3, because of the actuating force FB, the curved contact surface 20 rests against the flank 22 precisely at a contact point E. This contact point E is the starting point of the force introduced into the pawl 3 by way of the locking member 19. Because of the steep flank 22 arranged at a flank angle W, this force disintegrates into a horizontal component FH and into a vertical component FV acting as the supporting force. This component FV, by way of the roller 9, is supported on roller 6 acting as the supporting member.

By way of a contact surface 34 constructed on the pawl 3, this component FV is introduced into the roller 9 which is supported on the roller 6. This contact surface 34 is arranged to be slightly sloped in the direction of the stop 33 so that the force component FV' introduced by the contact surface 34 into the roller 9 points past the center M of the roller 9 at a narrow distance.

All forces are shown purely qualitatively in FIG. 3 and apply to both embodiments of the invention.

The flank angle W determines the direction of the component FH and is selected such that this component FH acts about the pivot B—B of the pawl 3 with a narrow distance H acting as a short lever. Such a design ensures that the actuating force FB is introduced essentially into this axis B—B and, as a result, the supporting force FV is slight. This has the result that the roller 9 can be slid from position S2 to position S1 by means of low forces. A corresponding design of the lifting magnet 14 permits the unlocking of the selector lever 1 by the operating of the brake pedal even when there are simultaneously acting high actuating forces FB.

The above-described force relationships exist in a corresponding form when, in the locked P- or N-position, a pulling on the selector lever 1 takes place in the direction that is opposite to the one illustrated in FIG. 3. The contact surface 21 will then rest against the flanks 23 in a contact point E.

The same applies to the second embodiment according to FIG. 5 in which then the contact surface 20 will rest against the flank 22.

As a modification of the above-described embodiments, contact point E may also be situated between linearly extending contact surfaces 20, 21 and convex surfaces 22, 23.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A locking arrangement comprising:

a selector lever of an automatic motor vehicle transmission, the selector lever being pivotable about a selector lever pivot axis a locking member arranged on the selector lever; and an adjustable pawl pivotable around a pawl pivot axis, the pawl pivot axis and the selector lever pivot axis being parallel, the adjustable pawl having indentations into which the locking member form-lockingly engages when a brake is not operated so that the selector lever is locked in neutral positions, the pawl having steeply extending flanks which bound the indentations and on which the locking member rests when the selector lever is locked and an actuating force is applied to the selector lever, the actuating force being introduced into the flanks of the pawl via contact surfaces on the locking member of the selector lever at a contact point of the flanks, said flanks determining a substantially horizontal force component and a substantially vertical force component of the actuating force.

2. An arrangement according to claim 1, wherein at least one of the force components introduced into the pawl extends so that it is at a narrow distance from an axis of rotation of the pawl.

3. A locking arrangement comprising:

a selector lever of an automatic motor vehicle transmission, the selector lever being pivotable about a selector lever pivot axis a locking member arranged on the selector lever; and an adjustable pawl pivotable around a pawl pivot axis, the pawl pivot axis and the selector lever pivot axis being parallel, the adjustable pawl having indentations into which the locking member form-lockingly engages when a brake is not operated so that the selector lever is locked in neutral positions, the pawl having steeply extending flanks which bound the indentations and on which the locking member rests when the selector lever is locked and an actuating force is applied to the selector lever, the actuating force being introduced into the flanks of the pawl via contact surfaces on the locking member of the selector lever at a contact point of the flanks, said flanks determining a substantially horizontal force component and a substantially vertical force component of the actuating force;

wherein at least one of the force components introduced into the pawl extends so that it is at a narrow distance from an axis of rotation of the pawl;

wherein the contact surfaces are convexly curved and the flanks are linearly extending flanks, the contact point is between the convexly curved contact surfaces and the linearly extending flanks.

4. A locking arrangement comprising:

a selector lever of an automatic motor vehicle transmission, the selector lever being pivotable about a selector lever pivot axis;

a locking member arranged on the selector level;

an adjustable bawl pivotable around a pawl pivot axis, the pawl pivot axis and the selector lever pivot axis being parallel, the adjustable 'pawl having indentations into which the locking member form-lockingly engages when a brake is not operated so that the selector lever is locked in neutral positions, the pawl having steeply extending flanks which bound the indentations and on which the locking member rests when the selector lever is locked and an actuating force is applied to the selector lever, the actuating force being introduced into the flanks of the pawl via contact surfaces on the locking member of the selector lever at a contact point of the flanks, said flanks determining a substantially horizontal force component and a substantially vertical force component of the actuating force; and a blocking member, which can be moved into a first and into a second position, and a supporting member stationarily disposed in a housing, the pawl being supported on the supporting member via the blocking member when the selector lever is locked.

5. An arrangement according to claim 4, further comprising an actuating element coupled to the blocking member such that the blocking member is movable from the second into the first position, the locking member, in the first position, being disengaged from the flanks.

6. An arrangement according to claim 4, wherein the pawl is arched and has a stop for the blocking member on an underside situated opposite the indentations.

7. An arrangement according to claim 6, wherein the blocking member, in the second position locking the selector lever, rests against the stop.

8. An arrangement according to claim 6, wherein the pawl has a blocking member contact surface for the blocking member, the blocking member contact surface being slightly sloped in the direction of the stop.

9. A locking arrangement comprising:

a selector lever for an automatic motor vehicle transmission;

a locking member arranged on the selector lever; and an adjustable pawl having indentations into which the locking member form-lockingly engages when a brake is not operated so that the selector lever is locked in neutral positions, the pawl having steeply extending flanks which bound the indentations and on which the locking member rests when the selector lever is locked and an actuating force is applied to the selector lever, the actuating force being introduced into the flanks of the pawl via contact surfaces of the selector lever at a contact point of the flanks, said flanks determining a substantially horizontal force component and a substantially vertical force component of the actuating force, further comprising a blocking member, which can be moved into a first and into a second position, and a supporting member stationarily disposed in a housing, the pawl being supported on the supporting member via the blocking member when the selector lever is locked.

10. An arrangement according to claim 9, wherein at least one of the force components introduced into the pawl extends so that it is at a narrow distance from an axis of rotation of the pawl.

11. An arrangement according to claim 10, wherein the contact surfaces are convexly curved and the flanks are linearly extending flanks, the contact point is between the convexly curved contact surfaces and the linearly extending flanks.

12. An arrangement according to claim 9, further comprising an actuating element coupled to the blocking member such that the blocking member is movable from the second into the first position, the locking member, in the first position, being disengaged from the flanks.

13. An arrangement according to claim 9, wherein the pawl is arched and has a stop for the blocking member on an underside situated opposite the indentations.

14. An arrangement according to claim 11, wherein the blocking member, in the second position locking the selector lever, rests against the stop.

15. An arrangement according to claim 11, wherein the pawl has a blocking member contact surface for the blocking member, the blocking member contact surface being slightly sloped in the direction of the stop.

* * * * *